United States Patent [19]

Lavelli

[11] 4,158,768

[45] Jun. 19, 1979

[54] BI-AXIAL SCANNING DEVICE FOR FOLLOWING THE OUTLINE OF A TEMPLATE

[75] Inventor: Riccardo Lavelli, Lugano, Switzerland

[73] Assignee: S.G.T.C. Societe Generale Internationale de Recherches Techniques et de Consulence S.a., Balzers, Liechtenstein

[21] Appl. No.: 837,216

[22] Filed: Sep. 27, 1977

[30] Foreign Application Priority Data

Sep. 27, 1976 [CH] Switzerland ............... 12201/76

[51] Int. Cl.² .......................................... G01D 5/30
[52] U.S. Cl. ............................. 250/202; 250/206; 250/215; 250/224
[58] Field of Search ............... 250/202, 206, 215, 216, 250/221, 224

[56] References Cited

U.S. PATENT DOCUMENTS

| 3,394,248 | 7/1968 | Ogden | 250/237 G X |
| 3,404,281 | 10/1968 | Fengler | 250/202 |
| 3,639,766 | 2/1972 | Ogden et al. | 250/202 |

Primary Examiner—Siegfried H. Grimm
Attorney, Agent, or Firm—Kurt Kelman

[57] ABSTRACT

A bi-axial scanning device for guiding a template copier for machine tools comprises a shaft carrying a scanner with a pointer at one end and adapted to assume a zero position and follow the shape of a plane profile from the zero position. A flat disc spring supports the shaft at an intermediate point for resilient pivoting. An optical device comprises a source of a calibrated light beam and a photo-detector arranged to receive the beam. Either the calibrated light beam or the photo-detector is in a fixed position and the other is displaceable with the pivoting of the shaft in response to the pointer in contact with the template, the displacement being detected by the photo-detector and producing control signals emitted from the photo-detector. An amplifier is connected to the photo-detector to receive the control signals and an outlet transmits the amplified control signals to the machine tools.

7 Claims, 4 Drawing Figures

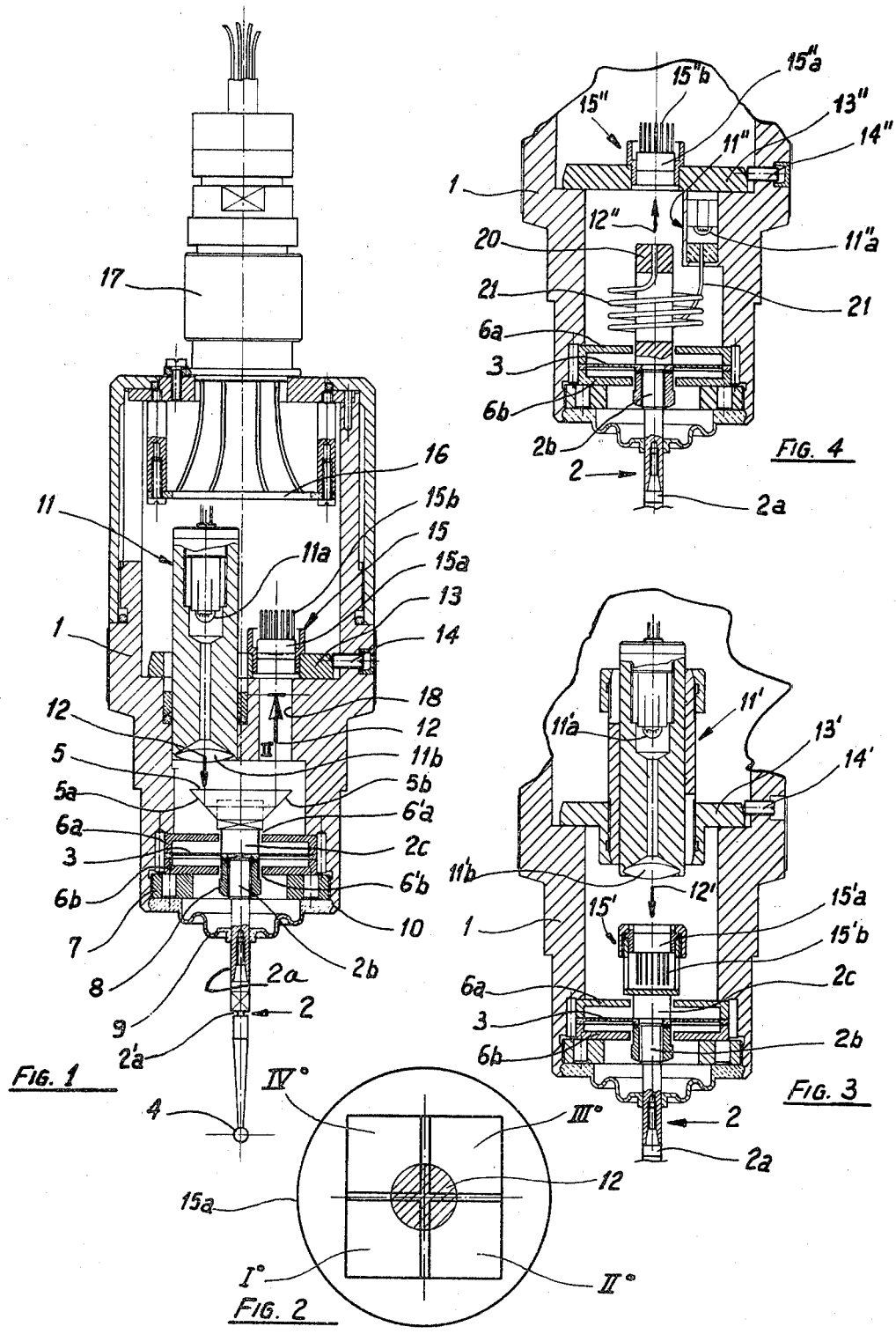

BI-AXIAL SCANNING DEVICE FOR FOLLOWING THE OUTLINE OF A TEMPLATE

The present invention concerns a bi-axial scanning device for following the outline of a template or the like shape defining means and guiding by electrical signals the means or devices which are provided for actuating the individual control shafts of machine tools.

Various scanners for the control of copying systems of electromechanical and hydraulic type are known which act on a plane according to two axes at right angles to each other and which, apart from being very complicated, have serious disadvantages and omissions, such as for example:

(a) the suffering of heavy wear on the internal driving members—said wear being the cause of errors of hysteresis and are normally only reduced in part by increasing the forces in play with the result of varying the considerable force against the outline of the template;

(b) the known electro-mechanical or hydraulic means being mechanically very complex and requiring expensive precision machining;

(c) a considerable response time with the known means due to the particular masses in play;

(d) the resultant signals of electro-mechanical scanners suffering from the limited frequency of the transducer employed;

(e) the requirement in hydraulic scanners of the hydraulic supply being limited to obtain good regulation with consequent limitation of power;

(f) the dimensions and weights are always being considerable in the known devices and there being applied only with difficulty to mobile operating heads.

These disadvantages and limitations of known types of scanners are eliminated or minimized with the scanner according to the present invention, which not only also has appreciable economy in constructions without reduction of precision, but also has an increase in sensitivity as will become apparent from the following description.

According to the present invention, there is provided a bi-axial scanning device for the guiding of template copying means for machine tools and the like, characterised in that it comprises a shaft pivoted resiliently on an intermediate point by means of a disc spring having a scanner at one end adapted to follow the shape of a plane profile and at the other end, having means connected thereto which are adapted to co-operate with a calibrated light beam and with a photo-detector element both for displacing the beam and transmitting it to said photo-scanner element located in a fixed position, or conversely, for intercepting a fixed luminous or light beam and displacing the photo-detector element, said displacement being effected by said means connected to the scanner starting from a central zero position and, in relation to the position assumed by the scanning pointer, for contact with the template; and said displacement being detected by the photo-detector element and transmitted to the amplifier members and then to the control means of the tools of the operating machine.

Preferably, the said displaceable shaft is pivoted in the centre of a flat disc spring, which is secured along its own circular perimeter, and the shaft has a scanning sphere, tip or the like at one end and, at the other end, a prism or the like deflection means having two faces displaced through 45°; said prism being located with one of its faces in the path of a calibrated illuminating beam substantially parallel to the shaft of the scanner when it is in a central resting position and with the other face disposed so as to direct the said beam towards a photo-detector of any suitable type which is divided into four segments corresponding to the four quadrants dividing the plane circular surface, through which the end of the scanner may pass, effecting the maximum deviation permitted from the central resting position.

The calibrated light beam may be produced by any known suitable means, such as a filament lamp and projector, solid state luminous source, laser and the like, and the said photo-detector may be a photo-cell, photo-diode matrix, light sensitive tube type or the like, said photo-detector being disposed on a support which may be oriented in a plane so that the scanner can be brought to zero before starting the detecting operation. The said photo-detector is located with the centre of the quadrants corresponding exactly to the centre of the beam, whilst the shaft is in the resting position. Any displacement of the scanner from its centre point causes, through a corresponding movement of the prism or the like connected to the shaft of the scanner, a proportional deviation of the light beam which therefore impinges on the photo-detector transducer at a point diverging from the centre point. This deviation is preferably detected and transmitted to electronic means of known type for amplifying signals and controlling the operative axes. As may be seen from what has been stated above and from the following embodiment, the scanner of the present invention has the mechanical part reduced to the minimum and only comprises the shaft and the resilient fulcrum, thereby eliminating all the hitherto wear of known types; the detecting movement being effected by a beam. This arrangement results in considerable advantages such as the elimination of errors of hysterisis, and the provision of a rapid response due to the limited masses in play, and also an extremely low force required of the scanner pressing on the template-weight, dimensions and costs being greatly reduced compared with known scanners. It is also possible to dispose the light beam to be deflected, directly on the shaft of the scanner, using an optical fibre channel or a source on the spot or to keep the beam in a fixed position and to move the photo-sensitive element connecting it firmly to the shaft of the scanner.

The invention will be described further, by way of example, with reference to the accompanying drawings, in which:

FIG. 1 is a longitudinal symmetrical axial section of a scanning device;

FIG. 2 illustrates on a magnified scale, the plane surface of a photo-detector element viewed on the line II of FIG. 1;

FIG. 3 is a longitudinal axial section of an alternative embodiment having the central zone of the device as in FIG. 1, with the application of the photo-sensitive element to the scanner; and FIG. 4 is a longitudinal axial section through a further embodiment of the device having the same central part but having an optical fibre conductor for the luminous beam displaceable with the shaft.

A scanning device is shown in FIG. 1 and comprises a cylindrical case 1 having a shaft 2 of the scanner mounted on the longitudinal axis of the case and pivoted in the centre of a disc spring or circular leaf spring 3 and having a scanning pointer 4 at its free end.

The shaft 2 comprises various parts connected together and incorporates a threaded end 2a to which the scanning pointer 4 is attached and which end 2a is provided with a reduced section 2'a so as to provide a predetermined rupture zone—an intermediate part having a thread 2b and an upper part having a fork 2c to which a prism 5 is secured.

The disc spring 3 is retained on its entire circumferential periphery on a suitable annular part of the case 1 by means of two opposing small dish-shaped plates 6a, 6b clamped by a threaded ring 7 screwed into the case 1 so as to bear uniformly along the entire circular perimeter of spring 3. The spring 3 is secured at its centre to the shaft 2 by means of a nut 8 screwed on the threaded part 2b of the shaft 2.

The part of the shaft 2 which penetrates into the case 1 has an elastic hood 9 which adheres to the centre of the shaft 2 and is locked on the periphery in a recess 10. A projector is schematically illustrated by 11 and is located axially displaced in the case but with its axis parallel to that of the case and the projector 11 carries a light source 11a and a concentrator or the like 11b adapted to emit a luminous or light beam 12 directed against the prism 5. The light beam 12 may be produced in any known manner and is preferably suitably reduced in diameter, for example, 1 mm approximately, and calibrated by known means (not shown).

A disc 13 is disposed within the case 1 on an annular support and is adapted to be positioned by means of a series of screws or the like 14, and carries a photo-sensitive element 15 having, for example, a photo-cell transducer 15a with four quadrants or sensitive elements such as photo-diode matrices, photo-sensitive tubes or the like; said cells being connected by means of conductors 15b with one or more amplifiers schematically indicated by 16. The conductors issuing from the amplifier extend to the outlet connector 17 and hence to the controls of machine shafts of known type (not shown). A hole 18 for the passage of the beam 12 is provided in the body 1 near the photo-sensitive element 15.

The prism 5 has two symmetrical faces 5a, 5b inclined at an angle of 45° relatively to the axis of the scanner 2 in such manner that the beam 12, coming from the projector 11, is reflected by the face 5a towards the face 5b and thence transmitted to the photo-sensitive element 15. The alignment of the axis of the photo-cell 15 with the axis of the scanner is obtained by rotating the entire photo-sensitive element 15 relatively to the disc 13.

FIG. 2 shows schematically on a magnified scale, the circle of the photo-sensitive element 15a divided into four quadrants I°, II°, III°, and IV° and the circular image of the luminous beam 12.

The operation of the device is as follows:

Initially the device is at zero, leaving the shaft of the scanner and moving the screws 14 free to displace the disc 13 until the beam 12 is in the centre of the circle 15a of the photo-sensitive element 15 and/or the element itself may be rotated until it is in alignment. This adjustment may be effected in known manner, for example, by the reaction of the photo-cells impinged on by the beam and by means of two voltmeters connected in pairs to the differential amplifiers and to the cells of two opposed quadrants.

When the device is at zero, the end 4 of the shaft of the scanner is placed in contact with a profile of the template to be copied, whereby the shaft itself is subjected to more or less accentuated deviations.

These deviations displace the prism 5 from its initial position and, consequently, the beam 12 is also deflected from this position and impinges on different zones of the quadrants of the photo-sensitive element 15 which, through the conductors 15b and the associated amplifier 16, guides the controls of the two axes associated with the precision tools.

The disc spring 3 is provided, in the case described, so that, because of its disc shape and since it is locked on the fixed part 1 along the entire outer circumference and on the displaceable shaft 2 along the central circumference, it has an identical reaction in every direction with a tendency to move to the initial plane position corresponding to the zero position. Other types of springs may be used suitable for this purpose provided that they have the same reaction in every direction of deviation of the shaft.

Furthermore, the two dish shaped plates 6a, 6b which clamp the circumferential periphery of the spring 3, are provided in their centres with respective holes 6'a and 6'b slightly greater in diameter than that of the parts 2c and 8 connected to the shaft 2. The small amount of play which remains is provided so that, if the shaft 2 is driven excessively beyond the central position and beyond the limit permitted for the exploration of the luminous beam 12 on the element 15, the said surfaces 2c and 8 come into contact with the holes 6'a, 6'b preventing any subsequent movement of the shaft 2. If, however, subsequent movement does occur, or an accidental jolt or any other reason of deviation occurs, the shaft itself cannot be inclined any further beyond the said contact limit so that the predisposed rupture zone 2'a gives way and breaks without damaging the device.

FIG. 3 shows a similar device to that of FIG. 1 but wherein, in place of the prism 5 connected to the end 2c of the shaft 2 of the scanner, a photo-sensitive element 15' identical to the element 15 of the device in FIG. 1 is provided having conductors 15'b for connection to amplifier 16. An identical projector 11' with illuminating source 11'a and concentrator 11'b emits a calibrated beam 12' which is intercepted by the photo-sensitive element 15'. According to this modification, the luminous beam 12' remains fixed in a central zero position, whilst the photo-sensitive element 15' is displaced by the scanning pointer in contact with the template, whereby the light beam falls on various points of the quadrants of the cell 15'a and is detected thereby. For bringing the beam 12' to zero relative to the centre of the photo-sensitive element a disc 13' is provided, in similar manner to the device of FIG. 1, which is adjustable in position by means of screws 14' relative to the case 1 of the device. In order to make the axis of the photo-cell 15'a of the sensitive element 15' coincide with the axis of the scanner or of the machine, the element 15' is rotated as in the device of FIG. 1. Operation is identical to that already described with reference to FIG. 1, except that the beam is fixed, whilst the photo-sensitive cell is displaceable with the scanner.

FIG. 4 shows another modification concerning the use of means for producing the illuminating beam in which a support 20 is provided at the end 2b of the shaft 2 of the scanner, and said support 20 carries the free end of an optical fibre conductor 21 that receives a beam from the fixed source 11"a of a projector 11" and causes it to issue in the direction of the arrow 12" co-axial with the shaft 2 of the scanner. The beam 12" impinges on the photo-sensitive element 15" identical with the photo-sensitive element 15 of the fixed device co-axial with the scanner 2. Operation in this case is identical to that of the device 1; the beam 12" being directly displaced by the shaft of the scanner 2, impinging on the photo-cell 15" which is fixed. It detects therefore all the displacements of the beam 12" caused by contact of the pointer of the scanner with the guiding template relatively to the zero position which is previously obtained, as in the case of the device shown in FIG. 1, by means of the disc 13" displaced by the screws 14" and by rotation of the photo-sensitive element 15".

Due to the flexibility of the optical fibre conductor 21, no obstacle is produced to restrict the movement of the shaft of the scanner 2, and the source 11"a could also be located outside the device without any difficulty.

It is understood that any variations or modifications and particularly of the parts, such as the deflector of the beam, the photo-sensitive element, the means of suspension, pivoting and the like, may be made without departing from the scope of the present invention.

What I claim is:

1. A bi-axial scanning device for guiding template copying means for machine tools and the like, which comprises
   (a) a shaft having two opposite ends and a point intermediate the ends,
      (1) a scanner with a pointer at one of the shaft ends and adapted to assume a zero position and follow the shape of a plane profile from the zero position,
   (b) a flat disc spring supporting the shaft at the interimediate point for resilient pivoting,
   (c) an optical device comprising a calibrated light beam means and a photo-detector means arranged to receive a calibrated light beam from the calibrated light beam means,
      (1) one of the optical device means being arranged in a fixed position and the other optical device means being connected to the other shaft end for displacement therewith upon pivoting of the shaft in response to the pointer in contact with the template, the displacement being detected by the photo-detector means and producing control signals emitted from the photo-detector means,
   (d) an amplifier means connected to the photo-detector means to receive the control signals therefrom, and
   (e) an outlet for transmitting the amplified control signals.

2. The bi-axial scanning device of claim 1, wherein the calibrated beams means comprises a prism connected for displacement to the other shaft end and adapted to deflect, without variations in dimension, the calibrated light beam in response to the pivoting of the shaft.

3. The bi-axial scanning device of claim 1, wherein the photo-detector means is a photo-cell transducer divided into four segments corresponding to four quadrants of a plane circle defined by the pivoting motion of the pointer.

4. The bi-axial scanning device of claim 1, wherein the flat disc spring is a circular disc having a periphery, further comprising two disc-shaped support members fixedly clamping the periphery of the circular disc in position, the disc-shaped support members defining central holes receiving the shaft and permitting only a specific deflection of the shaft from an axial position upon pivoting caused by a circle of exploration of the scanning pointer in contact with the template.

5. The bi-axial scanning device of claim 4, therein the shaft comprises a rupture portion designed to rupture when the specific deflection delimited by the central holes is exceeded.

6. The bi-axial scanning device of claim 1, further comprising a disc supporting the photo-detector means for rotation in the disc about an axis of the photo-detector means and set screws for displacing the disc and the photo-detector means rotatably supported therein in relation to the calibrated light beam means.

7. The bi-axial scanning device of claim 6, wherein the calibrated light beam means comprises a light beam source and an optical fiber conductor receiving the calibrated light beam from the source and coaxially connected to the other shaft end, the photo-detector means being arranged to receive the calibrated light beam from the optical fiber conductor.

* * * * *